(12) United States Patent
Carpenter et al.

(10) Patent No.: US 11,373,469 B2
(45) Date of Patent: Jun. 28, 2022

(54) POWER AND COMMUNICATION ARRANGEMENTS FOR AN ACCESS CONTROL SYSTEM

(71) Applicant: Schlage Lock Company LLC, Carmel, IN (US)

(72) Inventors: John C. Carpenter, Ingalls, IN (US); Joseph W. Baumgarte, Carmel, IN (US); Kevin P. Oehler, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 17/040,875

(22) PCT Filed: Mar. 21, 2019

(86) PCT No.: PCT/US2019/023348
§ 371 (c)(1),
(2) Date: Sep. 23, 2020

(87) PCT Pub. No.: WO2019/183340
PCT Pub. Date: Sep. 26, 2019

(65) Prior Publication Data
US 2021/0012599 A1 Jan. 14, 2021

Related U.S. Application Data (60) Provisional application No. 62/646,955, filed on Mar. 23, 2018.

(51) Int. Cl.
*G07C 9/00* (2020.01)
*H04L 12/66* (2006.01)

(52) U.S. Cl.
CPC ..... *G07C 9/00571* (2013.01); *G07C 9/00182* (2013.01); *H04L 12/66* (2013.01);
(Continued)

(58) Field of Classification Search
None
See application file for complete search history.

(56) References Cited

U.S. PATENT DOCUMENTS 5,936,544 A * 8/1999 Gonzales ............... G07C 9/22
340/5.22
6,259,352 B1 * 7/2001 Yulkowski ............. E05B 47/00
340/5.7
(Continued)

FOREIGN PATENT DOCUMENTS

WO 2015054646 A2 4/2015

OTHER PUBLICATIONS

International Search Report; US Patent and Trademark Office; International Application No. PCT/US2019/023348; dated Jun. 12, 2019; 2 pages.
(Continued)

*Primary Examiner* — Curtis J King
(74) *Attorney, Agent, or Firm* — Taft Stettinius & Hollister LLP (57) ABSTRACT

An access control system includes an electrically powered access control device for locking and unlocking a barrier, and an access controller coupled to the access control device. A Power over Ethernet (PoE) circuit receives power over an Ethernet cable and powers the access control device and the access controller. An active power supply buffer connects the access control device and the access controller with the PoE circuit.

17 Claims, 7 Drawing Sheets

(52) U.S. Cl.
CPC .............. *G07C 2009/00634* (2013.01); *G07C 2009/00825* (2013.01)

(56) References Cited

U.S. PATENT DOCUMENTS

| | | | | |
|---|---|---|---|---|
| 6,624,739 | B1* | 9/2003 | Stobbe | G07C 9/27 340/5.2 |
| 6,784,784 | B1* | 8/2004 | Zehrung | E05B 17/22 116/17 |
| 7,012,503 | B2* | 3/2006 | Nielsen | G07C 9/00182 340/5.6 |
| 8,284,798 | B2 | 10/2012 | Diab | |
| 10,033,972 | B2* | 7/2018 | Almomani | G07C 9/00182 |
| 2007/0074053 | A1* | 3/2007 | Bulusu | G06F 11/1441 713/300 |
| 2007/0075586 | A1* | 4/2007 | Bogue | H04L 12/10 307/66 |
| 2007/0130294 | A1* | 6/2007 | Nishio | H04L 63/029 709/219 |
| 2008/0202808 | A1* | 8/2008 | Tambe | H04L 12/28 174/504 |
| 2008/0209228 | A1* | 8/2008 | Chandler | G07C 9/00563 713/186 |
| 2008/0247113 | A1* | 10/2008 | Stroede | G07C 9/28 361/119 |
| 2010/0033232 | A1 | 2/2010 | Pan | |
| 2010/0149709 | A1* | 6/2010 | Straka | H02H 9/041 361/91.1 |
| 2011/0133551 | A1* | 6/2011 | Moller | H04L 12/40045 307/11 |
| 2012/0108168 | A1* | 5/2012 | Metivier | H02J 50/10 455/41.1 |
| 2012/0114122 | A1* | 5/2012 | Metivier | G07C 9/00817 380/247 |
| 2012/0200387 | A1* | 8/2012 | Hinkel | E05B 47/0046 340/5.26 |
| 2013/0093563 | A1* | 4/2013 | Adolfsson | G07C 9/32 340/5.7 |
| 2013/0293350 | A1* | 11/2013 | Hartmann | G07C 9/28 340/5.65 |
| 2014/0062656 | A1* | 3/2014 | Bowen | H04W 12/082 340/5.61 |
| 2014/0070003 | A1* | 3/2014 | Radicella | G07C 9/257 235/382 |
| 2014/0247113 | A1* | 9/2014 | Paquin | G07C 9/20 340/5.65 |
| 2015/0109098 | A1* | 4/2015 | Singh | G07C 9/28 340/5.6 |
| 2016/0005248 | A1* | 1/2016 | Aase | H04W 12/04 340/5.61 |
| 2016/0334856 | A1 | 11/2016 | Yseboodt et al. | |
| 2016/0371910 | A1* | 12/2016 | Baumgarte | G07C 9/00563 |
| 2017/0124792 | A1* | 5/2017 | Schoenfelder | G06F 21/34 |
| 2017/0132859 | A1* | 5/2017 | Troncoso | H04L 12/10 |
| 2017/0287248 | A1* | 10/2017 | Aase | G07C 9/00309 |
| 2019/0079125 | A1* | 3/2019 | Abrahams | G01R 21/006 |
| 2019/0096148 | A1* | 3/2019 | Hopkins | G07C 9/00182 |
| 2019/0310918 | A1* | 10/2019 | Frolikov | G06F 1/30 |
| 2020/0168017 | A1* | 5/2020 | Prostko | G07C 9/00563 |
| 2020/0235607 | A1* | 7/2020 | Kanarellis | H04L 43/0811 |

OTHER PUBLICATIONS

Written Opinion of the International Search Authority; US Patent and Trademark Office; International Application No. PCT/US2019/023348; dated Jun. 12, 2019; 6 pages.

Extended European Search Report; European Patent Office; European Patent Application No. 19771128.6; dated Nov. 29, 2021; 8 pages.

Canadian Office Action; Canadian Intellectual Property Office; Canadian Patent Application No. 3,098,711; dated Oct. 26, 2021; 3 pages.

* cited by examiner

POWER AND COMMUNICATION ARRANGEMENTS FOR AN ACCESS CONTROL SYSTEM

BACKGROUND

There are several types of systems that require both remote monitoring and a power supply. For example, an access control system for a building typically requires three separate cable runs to be able to provide power to the access control devices and various controllers and readers, and to monitor device status and provide communication to and receive feedback from the access control system. Furthermore, the unit that powers the access control system is not the same unit that manages the information sent to and received from the control system, and in turn requires separate connection points for the power supply and the communication system. Therefore, further improvements in the power and communication arrangements for access control systems is needed.

SUMMARY

According to an embodiment of the present disclosure, an access control system may include an access controller configured to be coupled to at least one access control device associated with a door or another opening of a building. The access control device may include, for example, an electronically and/or magnetically controlled lock, trim, operator, strike or panic exit bar. The access controller is associated with a Power over Ethernet (PoE) buffer communicatively coupled to a PoE circuit to receive power over an Ethernet cable for powering the access controller and the access control device. The PoE circuit provides a low voltage power supply that can be installed inexpensively without the expertise and/or materials required for installation of higher voltage power lines. The PoE buffer is connected to the access controller to provide power to the access controller, and also to provide and receive communication signals to the access controller, all through a single PoE connection.

The PoE buffer is also connected to the access control device either directly or indirectly through the access controller to provide power to the access control device to, for example, lock or unlock a lock. Further, the PoE buffer includes at least one capacitor active power supply that stores power delivered from the PoE circuit over time for powering the access control device in response to a high momentary power event, such as, for example, locking or unlocking a lock.

Further embodiments, forms, features, and aspects of the present disclosure shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature.

Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

The terms longitudinal, lateral, and transverse may be used to denote motion or spacing along three mutually perpendicular axes, wherein each of the axes defines two opposite directions. The directions defined by each axis may also be referred to as positive and negative directions. Additionally, the descriptions that follow may refer to the directions defined by the axes with specific reference to the orientations illustrated in the figures. For example, the directions may be referred to as distal/proximal, left/right, and/or up/down. It should be appreciated that such terms may be used simply for ease and convenience of description and, therefore, used without limiting the orientation of the system with respect to the environment unless stated expressly to the contrary. For example, descriptions that reference a longitudinal direction may be equally applicable to a vertical direction, a horizontal direction, or an off-axis orientation with respect to the environment. Furthermore, motion or spacing along a direction defined by one of the axes need not preclude motion or spacing along a direction defined by another of the axes. For example, elements described as being "laterally offset" from one another may also be offset in the longitudinal and/or transverse directions, or may be aligned in the longitudinal and/or transverse directions. The terms are therefore not to be construed as further limiting the scope of the subject matter described herein.

Figure 1:
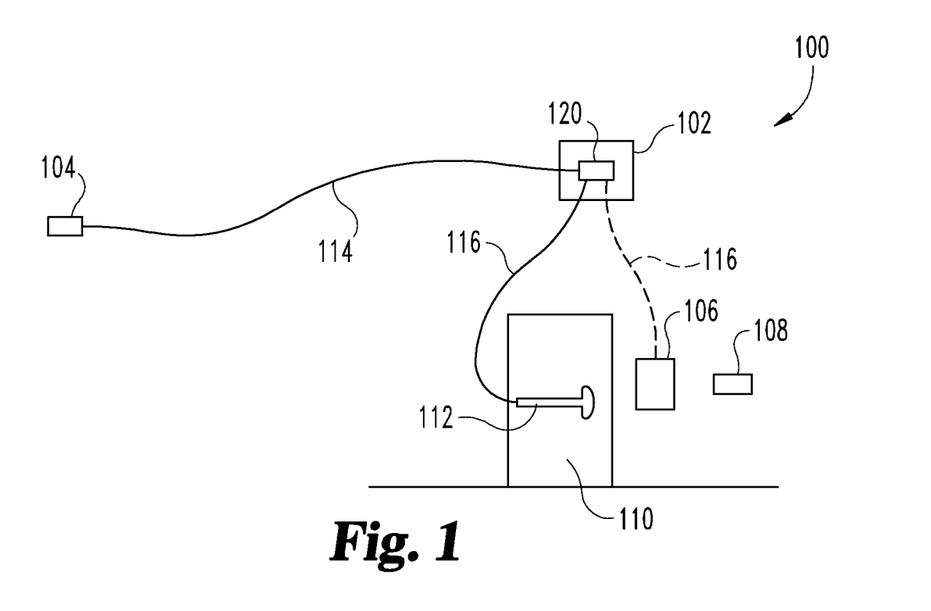
FIG. 1 is a simplified block diagram of at least one embodiment of an access control system.

Referring now to FIG. 1, the access control system 100 includes an access controller 102, a PoE source 104, at least one reader 106 for reading a credential 108, and an access control device 112. It should be appreciated that the access control system 100 may control access to a passageway through a movable barrier 110, such as a door or gate, to grant or deny user access through the passageway based on the credential 108 presented by the user. In particular, the access controller 102 may be electrically and/or communicatively coupled to the credential reader 106 and configured to make an access control decision based on credential data received from a credential presented by a user to the credential reader 106 (e.g., based on an access control database that defines access permissions for various users/credentials). However, inclusion of the credential reader 106 or any other type of reader is optional and may not be required in all embodiments.

The access controller 102 may be electrically and/or communicatively coupled to the electronic access control device 112, such as a lock, door strike, door latch, exit panic bar, a magnetic lock, an auto-operator, and/or other suitable lock or opening/closing mechanism configured to lock/unlock and/or open/close the corresponding passageway barrier (e.g., door/gate) such that the access controller 102 may instruct or signal (e.g., via a relay) the lock mechanism to permit/deny access through the barrier based on the access control decision. The access controller 102 is also electrically and communicatively coupled to a PoE buffer 120. It should be appreciated that the access controller 102 and/or PoE buffer 120 can be integrated with an electronic lock, or can be "peripheral" in the sense that it is not integrated with an electronic lock. That is, in the illustrated embodiment, the access controller 102 and/or PoE buffer 120 is not mounted on the door/barrier, but is instead mounted on or above a ceiling by the barrier 110. In addition, the reader 106 may be physically separate from the access controller 102 by the barrier 110 (as shown in FIG. 1) or may be integrated with the access controller 102 so that both are located by the barrier 110. In addition, the PoE buffer 120 may be integrated into the access controller 102 or may be provided as a unit separate from the access controller 102.

The access controller 102 may be configured to communicate with the PoE source 104, such as, for example, a PoE switch, router and/or another suitable PoE or low power connection. The access controller 102 may also communicate with one or more mobile devices (not shown), a computer (not shown), a gateway device (not shown), and/or reader or readers 106 using various communication connections or protocols. In particular, in some embodiments, the access controller 102 may communicate with the PoE source 104 through the PoE buffer 120 over an IP/PoE Ethernet connection link 114 that may be provided as a single cable connected to PoE buffer 120 to exchange firmware updates, audits, an access control database or updates thereto, an access control schedule, usage information, status information, diagnostics and/or other suitable data. In some embodiments, the access controller 102 may communicate with the one or more mobile devices (e.g., via a mobile application), a computer, laptop, tablet, or other device over a wireless connection such as a Bluetooth connection (e.g., BLE) and/or a Wi-Fi connection. For example, the access controller 102 may communicate with the mobile device(s) over a BLE connection to exchange data with a relatively small file size (e.g., configuration data) and/or over a Wi-Fi connection to exchange data with a relatively large file size (e.g., firmware updates, an access control database or updates thereto, audits, and/or usage information). The access controller 102 may also include a radio board or transceiver to provide connectivity with the internet wirelessly and/or to provide a gateway for an Internet of Things (IoT) connection.

Further, it should be appreciated that the access controller 102 may be communicatively coupled to one or more readers and/or access control devices. More specifically, in some embodiments, the access controller 102 may be communicatively coupled to the reader 106 and/or to the access control device 112 via one or more connection links 116, such as a serial communication link, opto-isolated sourced digital inputs, or other suitable cable, optical, or wireless connection link(s) 116. The connection link(s) 116 may also provide power from the PoE provided over the connection link 114 to the access control device 112 and/or the reader 106, either directly from the PoE buffer 120 or indirectly through the access controller 102.

In some embodiments, a management controller, such as a computer, mobile device, tablet, laptop, etc., may connect to the network and be configured to manage credentials, provide updates to, and receive information from the access control system 100. For example, the access controller 102 has updated authorized credentials, whitelists, blacklists, device parameters, and/or other suitable data. Similarly, in some embodiments, the management controller may be responsible for registering credentials with the access control system 100 and/or distributing appropriate credentials for authorized access through the passageway controlled by the access controller 102. Additionally, as described herein, the management controller may receive security data, audit data, raw sensor data, and/or other suitable data from the access controller 102 (e.g., directly or indirectly) for management of the access control system 100. In some embodiments, the management controller may be communicatively coupled with cloud server(s) and/or a cloud-based application. In other embodiments, the management controller may be embodied as an online server or a cloud-based server.

Further, in some embodiments, the management controller may communicate with multiple access controllers 102 at a single site (e.g., a particular building) and/or across multiple sites. That is, in such embodiments, the management controller may be configured to receive data from the access controller(s) 102 distributed across a single building, multiple buildings on a single campus, or across multiple locations. The reader 106 may be embodied as any credential and/or credential enrollment reader configured to read and/or enroll credentials.

As shown in FIG. 1, in use, the access controller 102 may be coupled to a reader 106 to control access through a passageway selectively blocked by barrier 110. As shown and described in greater detail below, the access controller 102 may be electrically coupled (e.g., via an output relay) to the access control device 112 such as a door strike, panic bar, or other lock mechanism that may be controlled to be in a locked state in which the access control device 112 prevents access through the passageway defined by and blocked by the barrier 110, and an unlocked state in which the access control device 112 permits access through the passageway. For example, in some embodiments, in response to a determination to grant access, a processor of the access controller 102 may transmit a signal to a corresponding output relay which, in turn, may be transmitted to the access control device 112 or another lock mechanism to electronically unlock the corresponding lock mechanism. In some embodiments, the access control device 112 includes a lock mechanism, such as a deadbolt, latch bolt, lever, and/or another mechanism, adapted to move under electrical power between the locked and unlocked state and perform the functions described herein. However, it should be appreciated that the lock mechanism may be embodied as another mechanism suitable for controlling access through a passageway in other embodiments.

It should be appreciated that the access controller 102 may receive power (e.g., 12-24V power) via PoE through the PoE buffer 120. Further, the access controller 102 may be electrically coupled to a door position sensor (DPS) and/or other sensors in some embodiments. As shown in FIG. 1, the access controller 102 may be located remotely from the access control device 112 (e.g., above the room ceiling) and may be configured to communicate with other devices of the access control system 100 such as, for example, via Wi-Fi and/or BLE communication protocols.

Figure 2:
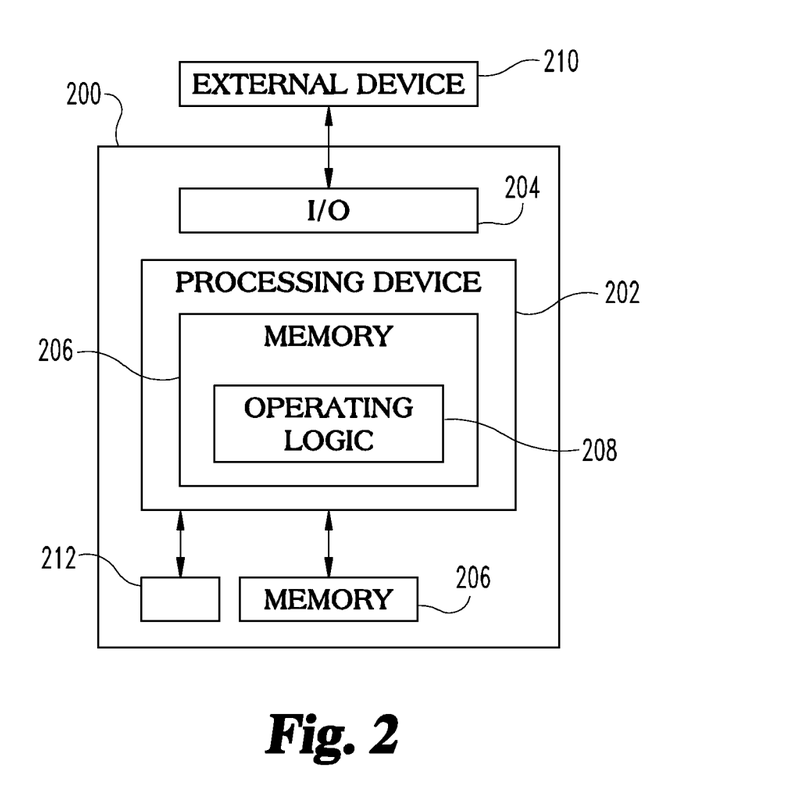
FIG. 2 is a simplified block diagram of at least one embodiment of a computing system.
Figure 3:
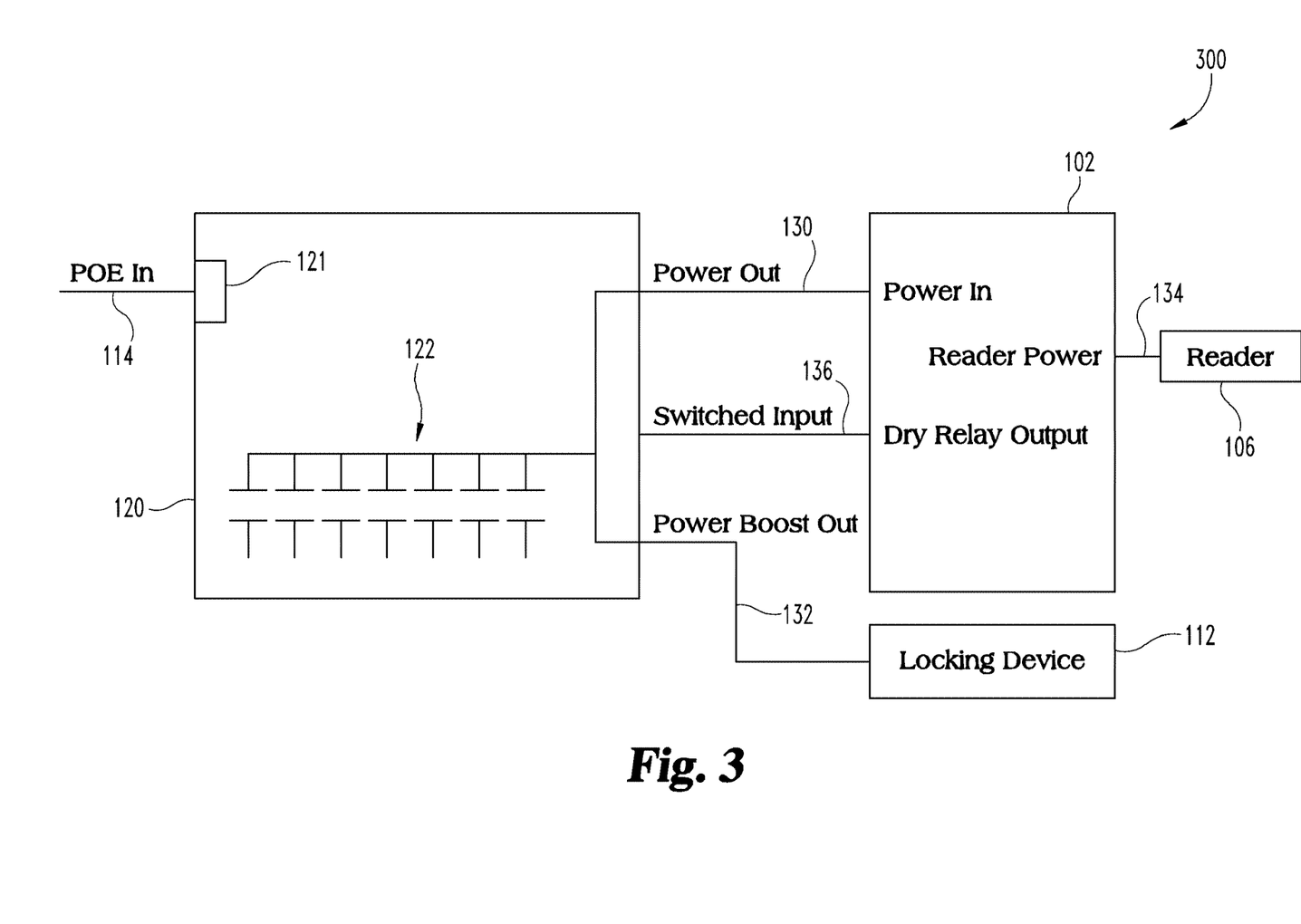
FIG. 3 is a simplified block diagram of one embodiment of hardware architecture for use with the access control system of FIG. 1.
Figure 4:
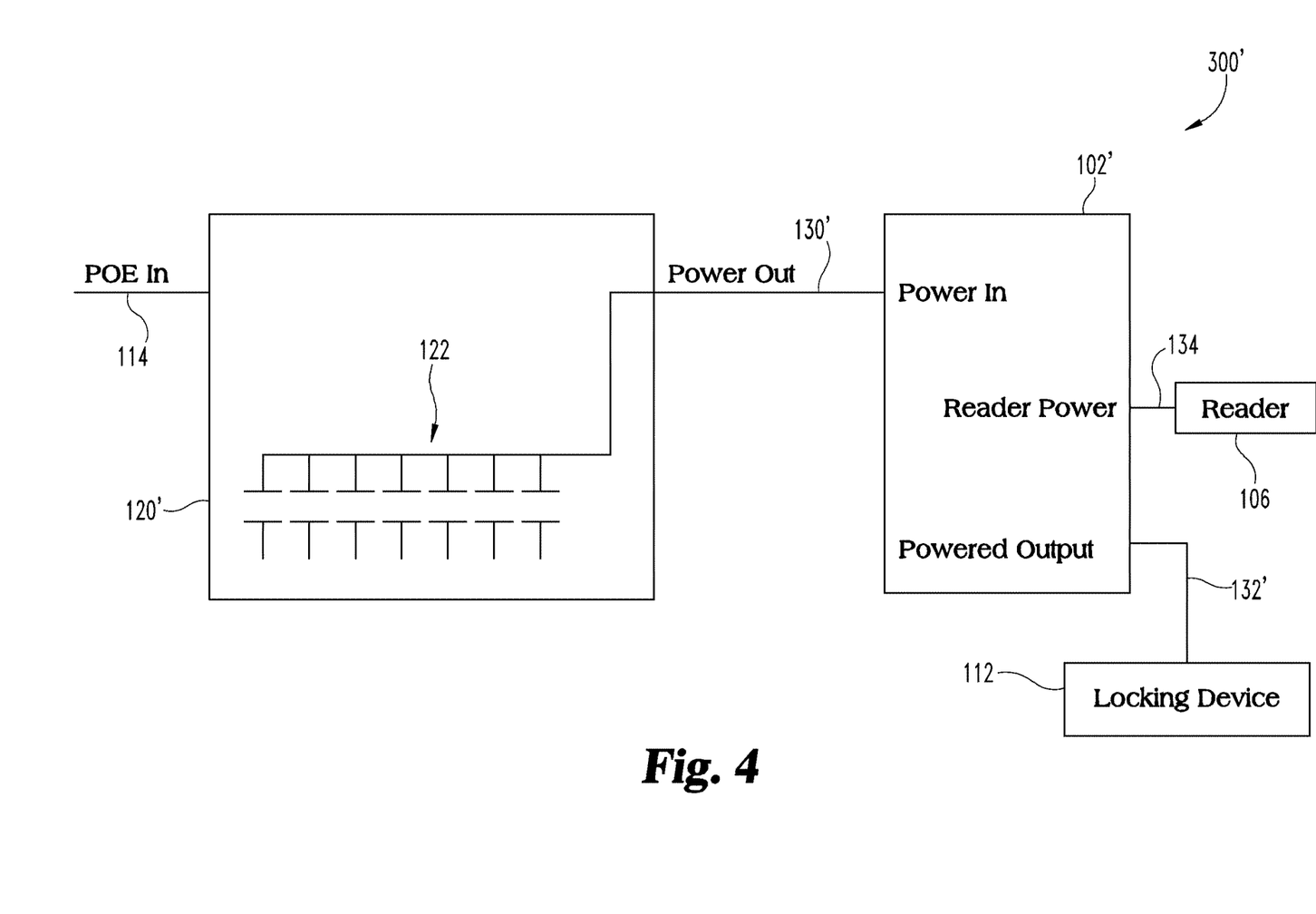
FIG. 4 is a simplified block diagram of another embodiment of hardware architecture for use with the access control system of FIG. 1.
Figure 5:
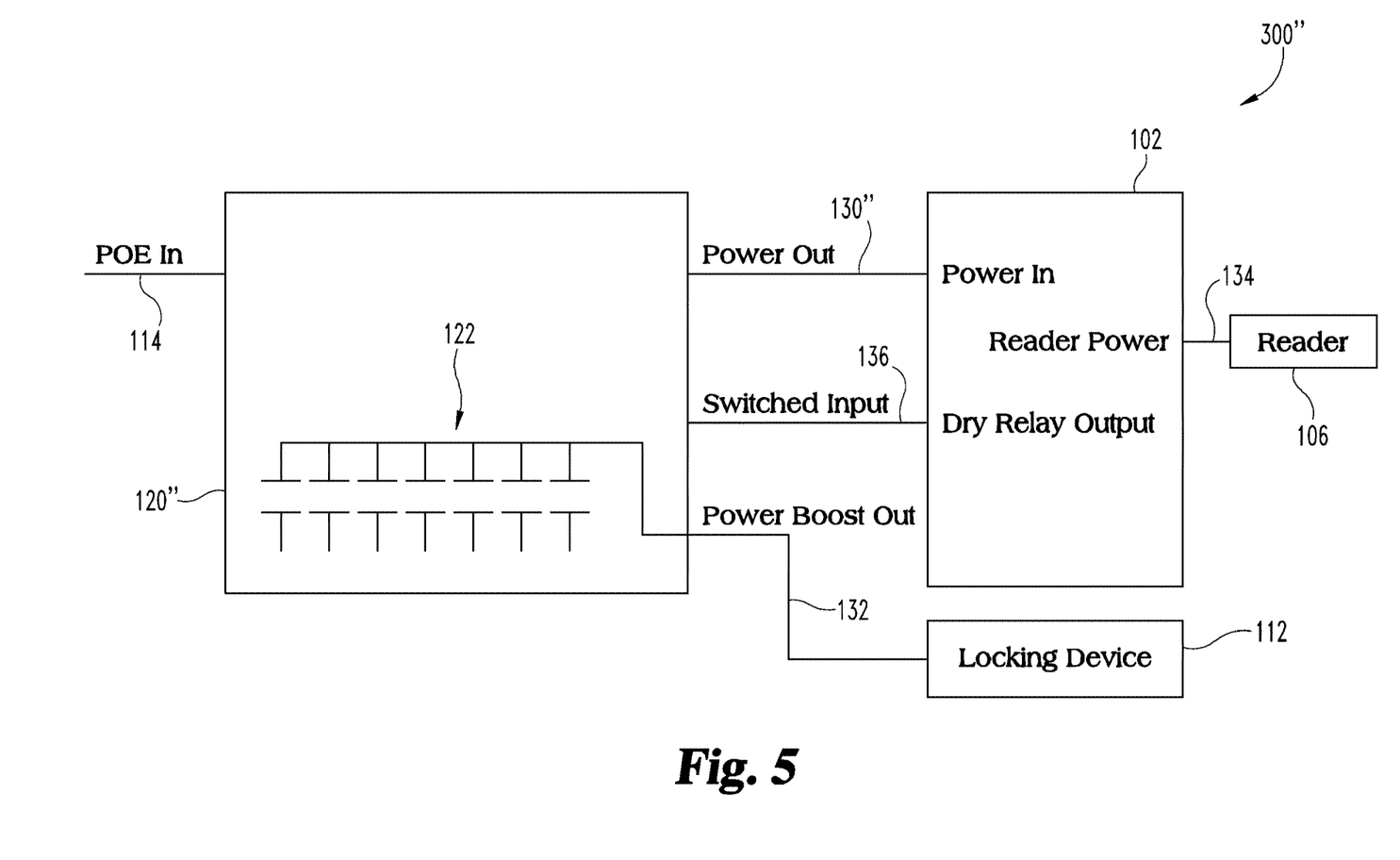
FIG. 5 is a simplified block diagram of another embodiment of hardware architecture for use with the access control system of FIG. 1.

It should be appreciated that, in some embodiments, the access controller 102 may include the hardware architecture described in reference to FIGS. 3-5. The PoE buffer may, in some embodiments, include the hardware architecture described in reference to FIGS. 3-5, and/or the PoE buffer 120 may include the active power supply described in reference to FIGS. 6 and 7. It should be further appreciated that each of the access controller 102, the PoE source 104, the reader 106, the access control device 112, and/or other computing devices may be embodied as a computing device including one or more features of the computing device 200 described below in reference to FIG. 2. For example, each of the access controller 102, the PoE source 104, the reader 106, and/or the other devices may include a processing device 202 and a memory 206 having stored thereon operating logic 208 for execution by the processing device 202 to control operation of a corresponding device.

Referring now to FIG. 2, a simplified block diagram of at least one embodiment of a computing device 200 is shown. Depending on the particular embodiment, the computing device 200 may be embodied as an access controller, a PoE source, a reader, a credential device, an access control device, a server, a desktop computer, a laptop computer, a tablet computer, a notebook, a netbook, an Ultrabook™, a mobile computing device, a cellular phone, a smartphone, a wearable computing device, a personal digital assistant, an IoT device, a control panel, a processing system, a router, a gateway, and/or any other computing, processing, and/or another communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, BLE, WiMAX, CDMA, LTE, GSM, IP, etc.) to affect such communication depending on the particular computing device 200. The input/output device 204 may include hardware, software, and/or firmware suitable for performing the techniques described herein.

The external device 210 may be configured as any type of device that allows data to be inputted or outputted from the computing device 200. For example, in various embodiments, the external device 210 may be embodied as the PoE source 104, an Ethernet, cloud server(s), a mobile device, a gateway device, reader 106, and/or the access control device 112. Further, in some embodiments, the external device 210 may be embodied as another computing device, sensor, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. The processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrated embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from the input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem 212, which may be embodied as circuitry and/or components to facilitate input/output operations with the processing device 202, the memory 206, and other components of the computing device 200. For example, the input/output subsystem 212 may be embodied as, or otherwise include, memory controller hubs, input/output control hubs, firmware devices, communication links (i.e., point-to-point links, bus links, wires, cables, light guides, printed circuit board traces, etc.), radio board(s) that are integrated or snapped into a printed circuit board, transceiver, and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, an I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

FIG. 3 depicts a hardware architecture 300 of an illustrative embodiment of the access control system 100. As shown, the illustrative hardware architecture 300 includes the access control device 102, the PoE buffer 120, the reader 106 and the access control device 112. The PoE buffer 120 is connected to the PoE connection link 114 which provides a constant source of power that is used to charge one or more capacitors for storage on a buffer circuit 122. In the illustrated embodiment, the PoE buffer circuit 122 is connected to the access controller 102 with a power out connection 130, and is connected to the access control device 112 with a power boost out connection 132. The connections 130, 132 provide power to power the access controller 102 and the access control device 112. In addition, a reader power connection 134 is provided between access controller 102 and the reader 106 to provide power to the reader 106 via the access controller 102. A switched input connection 136 provides updates, status, diagnostics and other signals to and from the access controller 102 and the PoE source 104 through the PoE buffer 120 via the PoE connection 114.

The buffer circuit 122 of the PoE buffer 120 can operate as an uninterrupted power supply for the access controller 102, the access control device 112, and the reader 106. In addition, the PoE buffer 120 can provide power boosting capabilities to allow for operation of high current devices. It should be appreciated that, in some embodiments, the access controller 102 of FIG. 1 may include additional and/or alternative components relative to the components depicted in the hardware architecture 300. Similarly, in some embodiments, one or more components of the hardware architecture 300 may be omitted from the access controller 102. As shown, the illustrated access controller 102 and the PoE buffer 120 of FIG. 3 can be secured to and/or positioned within a common housing or enclosure or separate housings or enclosures.

FIG. 4 depicts an alternate hardware architecture 300' for another embodiment of the access control system 100. As shown, the illustrative hardware architecture 300' includes the access control device 102, the PoE buffer 120, the reader 106 and the access control device 112. The PoE buffer 120 is connected to the PoE connection link 114 which provides power that is stored on a buffer circuit 122. In the illustrated embodiment, the buffer circuit 122 is connected to the access controller 102 with a power out connection 130'. However, in contrast to hardware architecture 300, the access controller 102 is connected to the access control device 112 with a power out connection 132' to provide power to the access control device 112 from the PoE buffer 120 through the access controller 102. The connection 130' provides power to the access controller 102 from the buffer circuit 122, and the connection 132' provides the buffer circuit power to the access control device 112. In this embodiment, in response to the power being terminated, power can be provided from the buffer circuit 122 for a period of time to power the access controller 102, the reader 106 and/or the access control device 112.

FIG. 5 depicts an alternative hardware architecture 300" for another illustrative embodiment of the access control system 100. As shown, the illustrative hardware architecture 300" is the same hardware architecture 300 of FIG. 3, except that only the access control device 112 is connected to the buffer circuit 122 via the power connection 132. The access controller 102 receives power from the PoE connection 114 directly so that the access controller 102 fails-safe as soon as power is removed. However, the buffer circuit 122 can still provide power for a period of time after the power outage to unlock the access control device 112.

The illustrative PoE buffer(s) 120, 120', 120" include an Ethernet interface 121 (FIG. 3) for receiving Ethernet data communication and PoE from the PoE source 104, such as a router, switch, or other suitable device. For example, the Ethernet interface may support PoE IEEE 802.3af (up to 15.4 W) and/or PoE+ IEEE 802.3at (up to 25.5 W). In other embodiments, it should be appreciated that the access controller 102, the reader 106, and/or the access control device 112 may, additionally or alternatively, be powered via a battery or another independent power source.

The illustrative buffer circuit 122 and/or other circuitry in the PoE buffer 120 and/or the access controller 102 is configured to convert power received from the interface 121 from the PoE power supply into power usable by the access controller 102, the reader 106 and/or the access control device 112. For example, in the illustrated embodiment, the power circuitry can be configured to convert the supplied power into 12V power (e.g., for the reader), 3.3V power (e.g., for other circuit components), and/or wet power (e.g., to power the wet strike, wet auxiliary, and/or wet alarm components via relays). Further, the power circuitry may handle the PoE power and include power LEDs and suitable power storage such as, for example, at the buffer circuit 122.

Figure 6:
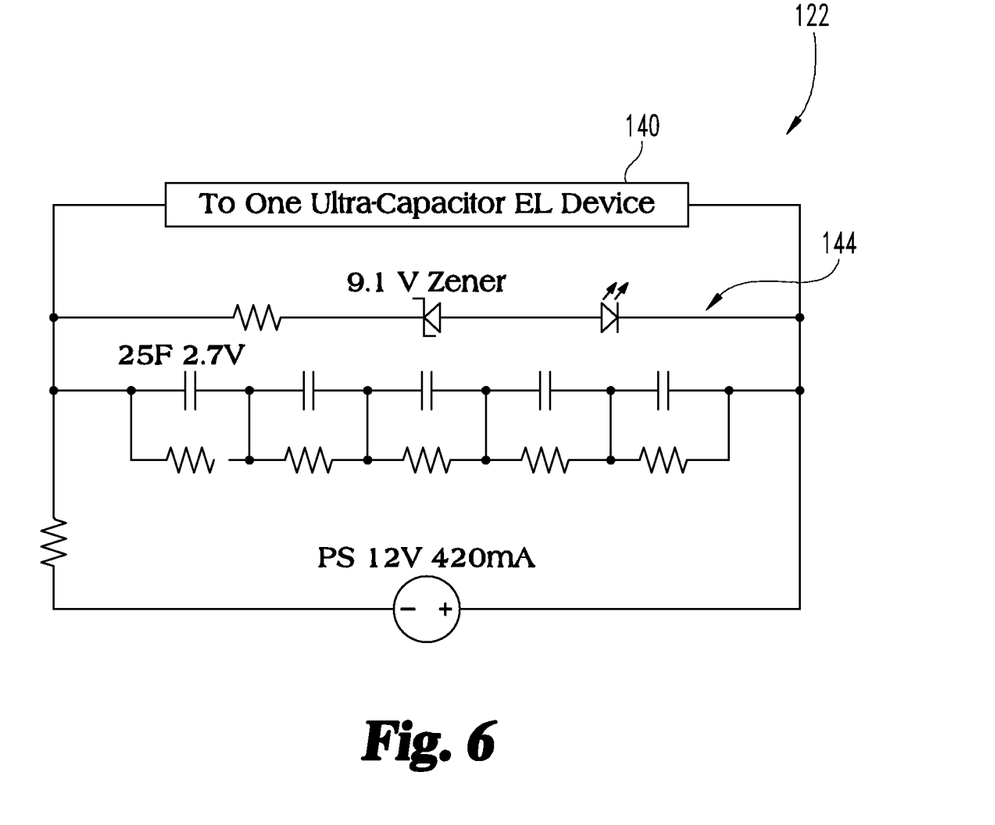
FIG. 6 is a circuit diagram of one embodiment of an active power supply buffer for providing power to an access control system or other device.

Referring to FIG. 6, illustrated therein is one embodiment of the buffer circuit 122. The buffer circuit 122 is configured to operate an access control device with a power supply only capable of producing 12V at 5 Watts for a maximum duty cycle with sustainability. The buffer circuit 122 includes at least one capacitor 140, such as an ultra-capacitor, an RTC supercapacitor, or any suitable solid state capacitor, which is charged by a low voltage power source (PS), thereby providing a low cost to install and low cost power. The buffer circuit 122 uses a Lambda 5 W 12V 420 mA switching power supply to charge a circuit of 13.5V 5F capacitance. Arranged parallel with the capacitor circuit is a Zener/LED circuit 144 that includes an LED to indicate a charged status of the capacitor 140 to an end user. For example, the LED can include differently colored indicators to indicate a charging status as completely charged, no charge, and charging conditions in between completely charged and no charge.

In one embodiment, the charging of the capacitor 140 can be accomplished with a resistor specified for the last two volts so that when the switching power supply sees a load with a high current value, it "hiccups" and folds back and tries again to charge every half second. Each time the switching power supply folds back, the capacitor(s) 140 are charged incrementally until the capacitor(s) 140 are able to charge with constant current for the rest of the cycle, thereby allowing the buffer circuit 122 to be responsive at maintaining the charge once the capacitor(s) 140 are charged. The capacitor(s) 140 can also be charged effectively using pulse width modulation from a microcontroller through a field-effect transistor (not shown).

Figure 7:
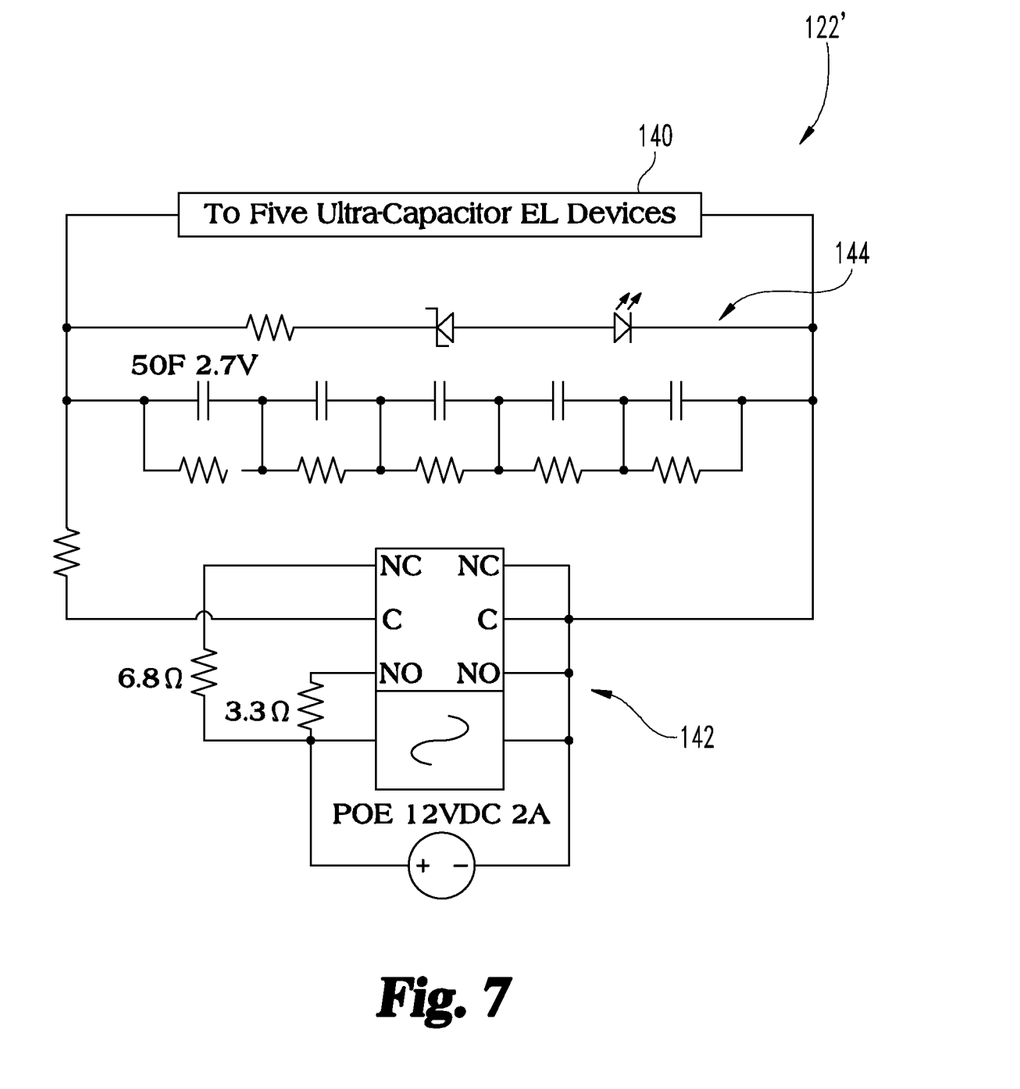
FIG. 7 is a circuit diagram of another embodiment of an active power supply buffer for providing power to the access control system or other device of FIG. 1.

FIG. 7 is illustrative of another embodiment of a buffer circuit 122' that is operable with a 12 VDC 2A low voltage power supply to supply power for charging five capacitors 140'. The buffer circuit 122' operates at a maximum duty cycle of 25 W to operate up to five access control devices 112. Since PoE does not have the same "hiccup" as the switching power supply shown in the FIG. 6 embodiment, the buffer circuit 122' includes a dual stage charging circuit 142. The dual stage charging circuit 142 charges across a 6.8 ohm resistor until 7.3 V of charge is achieved, and then a relay switches the charge resistance to a 3.3 ohm resistor to reduce the charge cycle.

In another embodiment, the buffer circuit 122' is provided as a separate "power pack" that can be recharged and then transported to the various locks to locally re-charge capacitors in the local PoE buffers 120. For example, the power pack can be plugged directly into the local PoE buffer(s) 120 to re-charge or refresh the capacitor(s). In one embodiment, the power pack is part of an off-line access control system in which the PoE buffer 120 includes capacitors and is readily transported around the facility.

Figure 8:
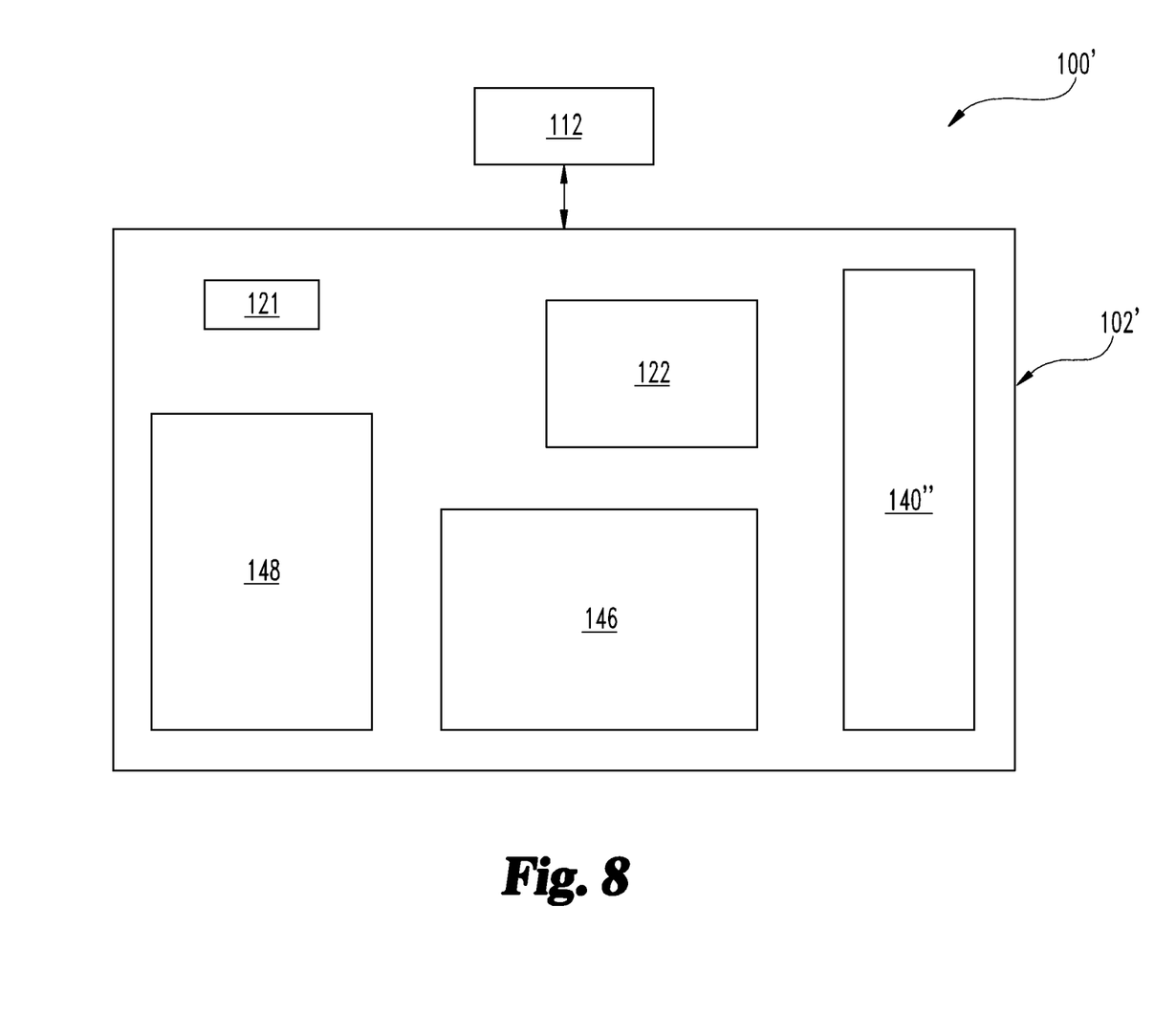
FIG. 8 is a block diagram of another embodiment of an access control system including a buffer circuit.

FIG. 8 shows another embodiment of an access control system 100' that is similar to the access control system 100 discussed above, and like elements are designated with like reference numerals. The access control system 100' includes one or more access control devices 112 and an access controller 102'. The access control device 112 can include one or more wireless locks, panic devices, trims, strikes, magnetic locks, and any other security product adapted for use with door access control. The access control device 112 can provide one or more signals to the access controller 102', such as signals for a door position, an output from a magnetic bond sensor, a signal indicating a request to exit, a latchbolt monitor signal, or any other signal from an access control device 112. The access control device 112 can also provide and receive wired and wireless signals from the Internet and/or the IoT, and also provide connectivity to electronic credential readers and other input devices for access control, including cell phones and other wireless protocols.

The access controller 102' includes an interface 121 to receive a PoE input from the PoE source 104. The interface 121 is connected to a supply source, such as a buffer circuit 122, which provides a constant power supply or constant current supply for charging the balanced capacitor array 140". The capacitor array 140" includes one or more capacitors for storing power over time and providing power for operating the access controller 102' and/or the access control device 112.

The access controller 102' also includes a microcontroller 146 that is provided with non-volatile memory and active RAM. The microcontroller 146 may also include an IP PoE chip for managing the PoE/PoE+ switching and power management. The microcontroller 146 also includes connectivity on bus for digital and analog I/O, relay circuitry, radio board connectivity, fire alarm relay control, status and lighting circuitry, and Ethernet digital communications. In one embodiment, the microcontroller 146 includes a screw header or other connector that allows digital and analog I/O of solid state or relay type for connectivity to security products as well as wired IoT devices. The firmware embedded in the microcontroller 146 can be upgradable and updatable, and can allow monitoring, access control, diagnostics, settings, and connectivity to the IoT.

The access controller 102' also includes an optional radio card 148 that can be integrated into the access controller 102' or having snap-in connection with the microcontroller 146. The radio card 148 can provide connectivity to the IoT or any other existing or future radio frequency technology.

According to an embodiment, a access control system may include an electrically powered access control device for locking and unlocking a door, an access controller configured to be coupled to the access control device, a Power over Ethernet (PoE) circuit configured to receive power over an Ethernet cable for powering the access control device and the access controller, and at least one active power supply buffer connecting the access control device and the access controller with the PoE circuit.

In some embodiments, the access control device is one of an electronic panic bar, an electronic lock, a magnetic lock, an auto-operator and an electronic strike for a door. In other embodiments, the access controller includes a radio board for wireless connectivity to the Internet. In still other embodiments, the power supply buffer includes a first power connection with the access controller and a second power connection with the access control device.

In some embodiments, the access controller includes a third power connection with an electronic reader device configured to receive one or more credentials to be analyzed for an access control decision. In other embodiments, the access controller includes a signal connection with the power supply buffer to provide communication signals between at least one of the access control device and the access controller to a PoE source connected with the PoE circuit.

In some embodiments, the power supply buffer includes a buffer circuit connected to each of the access controller and the access control device via respective ones of the first power connection and the second power connection. In other embodiments, the power supply buffer includes a buffer circuit, and wherein the access control device is connected to the buffer circuit. In still other embodiments, the power supply buffer includes a first power connection with the access controller, and wherein the access controller includes a second power connection with the access control device.

In some embodiments, the access controller includes a third power connection with a reader device that is configured to receive one or more credentials to be analyzed for an access control decision.

In some embodiments, wherein the at least one active power supply buffer includes a buffer circuit with at least one capacitor that is charged with power from the PoE circuit.

In some embodiments, the buffer circuit of the at least one active power supply buffer includes two or more capacitors. In other embodiments, the buffer circuit of the at least one active power supply buffer includes five capacitors.

According to another embodiment, an access control system may include an electrically operated access control device for locking and unlocking a door, a Power over Ethernet (PoE) circuit configured to receive power over an Ethernet cable for powering the access control device, and at least one active power supply buffer connecting the access control device with the PoE circuit, wherein the at least one active power supply buffer includes at least one capacitor configured to store power for operating the access control device.

In some embodiments, the at least one active power supply buffer includes two or more capacitors. In other embodiments, the at least one active power supply buffer includes five capacitors. In still other embodiments, the active power supply buffer includes a dual stage charging circuit for charging the capacitors.

According to yet another embodiment, a method for powering an access control system may include connecting an electrically powered access control device configured for locking and unlocking a door and an access controller associated with the access control device to a Power over Ethernet (PoE) circuit configured to receive power over an Ethernet cable, storing power from the PoE circuit in a buffer circuit, and powering at least one of the access control device and the access controller with power stored in the PoE buffer circuit.

In some embodiments, connecting the electrically powered access control device includes at least one active power supply buffer connecting the access control device and the access controller with the PoE circuit. In other embodiments, storing power from the PoE circuit includes storing power on at least one capacitor of the buffer circuit. In still other embodiments, storing power from the PoE circuit includes storing power on five capacitors of the buffer circuit.

What is claimed is:

1. An access control system, comprising:
an electrically powered access control device comprising a lock for locking and unlocking a door;
an access controller configured to be coupled to the access control device;
a Power over Ethernet (PoE) circuit configured to receive power over an Ethernet cable for powering the access control device and the access controller; and
at least one active power supply buffer connecting the access control device and the access controller with the PoE circuit, the at least one active power supply buffer including a buffer circuit with at least one capacitor to store power sufficient to operate the access control device during a termination of power from the PoE circuit and a high momentary power event requiring a higher current draw, wherein the at least one capacitor is charged with power from the PoE circuit;
wherein the at least one active power supply buffer includes a power out connection connected to the access controller and a power out boost connection that connects the access control device to the at least one capacitor of the buffer circuit; and
wherein the at least one capacitor provides a power boost to the lock of the access control device in response to the higher current draw corresponding to locking or unlocking of the lock.

2. The access control system of claim 1, wherein the lock is one of an electronic panic bar, an electronic lock, a magnetic lock, an auto-operator, or an electronic strike for the door.

3. The access control system of claim 1, wherein the access controller includes a radio for wireless connectivity to the Internet.

4. The access control system of claim 1, wherein the access controller includes a third power connection that powers an electronic reader device configured to receive one or more credentials to be analyzed for an access control decision.

5. The access control system of claim 1, wherein the access controller includes a signal connection with the power supply buffer to provide communication signals between at least one of the access control device and the access controller to a PoE source connected with the PoE circuit.

6. The access control system of claim 1, wherein only the access control device is connected to the buffer circuit.

7. The access control system of claim 1, wherein the buffer circuit of the at least one active power supply buffer includes two or more capacitors.

8. The access control system of claim 1, wherein the buffer circuit of the at least one active power supply buffer includes five capacitors connected to operate five connected access control devices.

9. The access control system of claim 1, wherein the power supply buffer is located adjacent the door.

10. The access control system of claim 1, wherein the power supply buffer is integrated into the lock.

11. The access control system of claim 10, wherein the power supply buffer is integrated into the access control device or the access controller.

12. An access control system, comprising:
an electrically operated access control device comprising a lock for locking and unlocking a door;
a Power over Ethernet (PoE) circuit configured to receive power over an Ethernet cable for powering the access control device; and
at least one active power supply buffer connecting the access control device with the PoE circuit, wherein the at least one active power supply buffer includes a buffer circuit with at least one capacitor configured to store power from the PoE circuit for operating the access control device during a termination of power from the PoE circuit and during a high momentary power event requiring a higher current draw, and wherein the at least one capacitor is charged with power from the PoE circuit;
wherein the at least one active power supply buffer includes a power out connection connected to the access controller and a power out boost connection that connects the access control device to the at least one capacitor of the buffer circuit; and
wherein the at least one capacitor provides a power boost to the lock of the access control device in response to the higher current draw corresponding to locking or unlocking of the lock.

13. The access control system of claim 12, wherein the at least one active power supply buffer includes two or more capacitors.

14. The access control system of claim 12, wherein the at least one active power supply buffer includes five capacitors connected to operate five connected access control devices.

15. The access control system of claim 14, wherein the active power supply buffer includes a dual stage charging circuit for charging the capacitors, the dual stage charging circuit including a first circuit with a first charge resistance to charge the five capacitors to a first charge, and a second circuit with a second charge resistance less than the first charge resistance to charge the five capacitors to a second charge greater than the first charge.

16. A method for powering an access control system, comprising:
connecting an electrically powered access control device comprising a lock configured for locking and unlocking a door and an access controller associated with the access control device to a Power over Ethernet (PoE) circuit configured to receive power over an Ethernet cable, wherein the connecting includes connecting a power out connection of an active power supply buffer to the access controller and connecting a power out boost connection of the active power supply buffer to the access control device, the power out boost connection connecting at least one capacitor of a buffer circuit in the active power supply to the access control device;
storing power from the PoE circuit by charging the at least one capacitor of the buffer circuit of the active power supply buffer with the power from the PoE circuit; and
powering the access control device with power stored in the at least one capacitor of the buffer circuit to operate the access control device during a termination of power from the PoE circuit and a high momentary power event requiring a higher current draw; and
wherein the at least one capacitor provides a power boost to the lock of the access control device in response to the higher current draw corresponding to locking or unlocking of the lock.

17. The method of claim 16, wherein storing power from the PoE circuit includes storing power on five capacitors of the buffer circuit to operate five connected access control devices.

* * * * *